United States Patent Office.

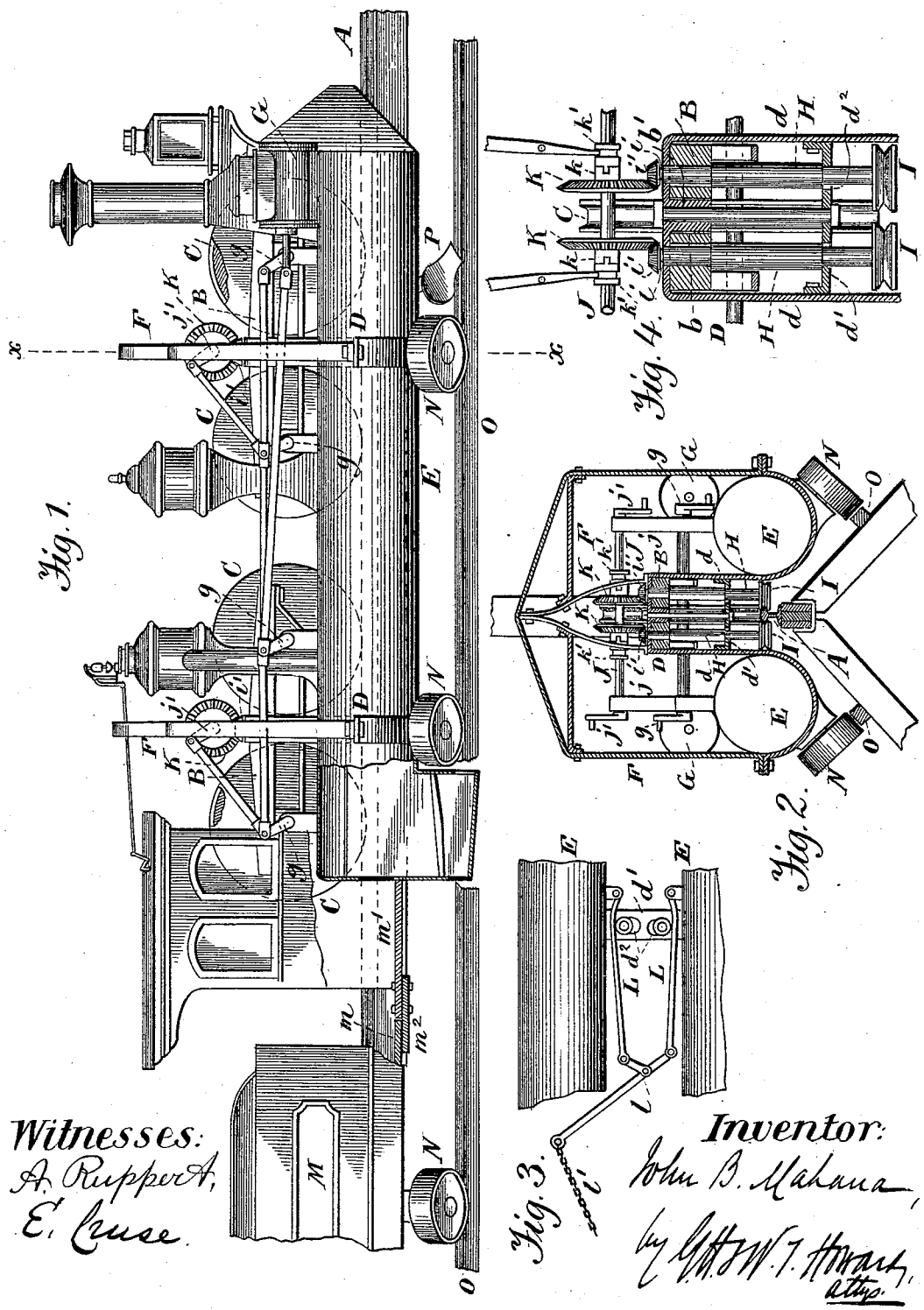

JOHN B. MAHANA, OF FREEWATER, OREGON.

LOCOMOTIVE.

SPECIFICATION forming part of Letters Patent No. 461,483, dated October 20, 1891.

Application filed January 24, 1891. Serial No. 378,967. (No model.)

*To all whom it may concern:*

Be it known that I, JOHN B. MAHANA, of Freewater, in the county of Umatilla and State of Oregon, have invented certain new and useful Improvements in Locomotives, of which the following is a specification, reference being had to the accompanying drawing, and to the letters of reference marked thereon.
My invention relates to locomotives for single-rail railways, and has for its object to increase the traction without adding to the weight of such locomotives in order that they may be capable of moving a heavier load than heretofore. It is well known that the slipping of the drivers of a locomotive when starting a heavy load and when running upgrade is a source of much annoyance and waste of power, and many devices have heretofore been employed to increase the traction, as in some cases by adding weight to the locomotive and in others by using a supplemental rail either with or without teeth, with which parts of the locomotive have been adapted to engage. All these devices are objectionable, either on account of additional cost in the equipment of the road or inadequacy of results obtained. My invention is designed to reach the desired end with very little additional mechanism on the locomotive, no material increase in the weight thereof, and without the use of a supplemental rail.

My invention consists in the several details of construction and arrangement of parts hereinafter fully set forth in the specification, and particularly pointed out in the claims.

In the drawings, Figure 1 is a side elevation of my improved locomotive. Fig. 2 is a vertical transverse section taken on the line $xx$ of Fig. 1. Figs. 3 and 4 are detached details.

Similar letters of reference indicate similar parts in the respective figures.

A represents the bearing-rail of a single-rail railway, which is supported on a suitable bed elevated above the ground.

B B show the trucks of the locomotive. Each truck is provided with two drivers C C, one in advance of the other, having suitable bearings in the truck. The front wheel of the forward truck and the rear wheel of the rear truck are centrally grooved to fit over the tread of the rail, the other two wheels being flat and with somewhat wider treads for the purpose of allowing the locomotive to travel on curves without straining the running-gear and at the same time keep all the wheels bearing on the track.

D represents a saddle-frame. Each truck carries one of these frames, and the top of the truck is provided with a socket $b$, into which a boss $b'$ on the frame enters. This gives a pivotal movement between the truck and frame. The saddle-frames are supported between the wheels of the trucks, and the lower ends of their vertical sides $d$ are curved to form supports for the boilers E E. The boilers are thus suspended from the trucks on either side of the rail and partly below it. A strut $d'$ extends between the vertical sides of each saddle-frame for the purpose of preventing the forcing of the sides toward each other.

A suitable system of braces and ties (designated as a whole by F) rests on the upper part of each truck, and is connected to the curved ends of the saddle-frame to insure a firm and sufficient support for the boiler.

G G are the steam-cylinders, and $g\ g$ the cranks on the drivers, each crank being connected to the piston of its cylinder in the ordinary way.

H H are sleeves passing through the strut $d'$, the top of the truck B, and the saddle-frame D. The sleeves fit tightly in the saddle-frame, but have a slight play in the top of the truck and also a slight play in the strut $d'$ transversely of the track.

I I are horizontal wheels having a central V-shaped groove adapted to fit over the tread of the rail A on each side thereof. The shafts $i$ of the wheels I pass through the sleeves H, and each shaft carries at its upper end a horizontal bevel-pinion $i'$, located just above the saddle-frame.

J is a shaft revoluble in suitable bearings $j$, secured to the top of the boilers. This shaft extends across the truck and is provided at each end with a crank $j'$, connected to the crank of the driver nearest to it. The shafts J will thus have uniform revolution with the drivers. Each shaft J carries two bevel-gears K K, adapted to turn loosely thereon. These gears K have one half of a clutch $k$, the other halves $k'$ of the clutches being keyed on the shaft J. When the two halves of the clutches are brought into engagement, the gears K will revolve with the shaft J and uniformly with the drivers of the truck. The gears K are adapted to engage with the bevel-pinions $i'$, and thus impart revolution to the wheels I I. In their normal position and when the drivers are perpendicular the wheels I I will have a space of about one-fourth of an inch between them and the rail, and they then serve to relieve the strain on the bearings of the drivers when the truck sways in either direction, and also to prevent the drivers jumping the track. When the two halves of the clutches are out of engagement, they will have no revolution, except incidentally, when brought in contact with the rails by the swaying of the truck. In order to give the wheels I the revolution necessary to cause them to travel along the rail at the same speed as the drivers, the gears K and pinions $i'$ must have the proper diameters relative to each other.

In order to bring the wheels I into engagement with the rail I use levers L L, pivoted at one end to the boilers E, so as to engage the sleeves H just above the strut $d'$, as shown particularly in Fig. 3. The other ends of the levers L are connected by a toggle-joint $l$, and a chain $l'$ leads therefrom to any convenient place in the cab. By pulling on the chain $l'$ the levers will be moved toward each other and will move the sleeves H in the elongated holes $d^2$ in the strut $d'$, and thereby bring the wheels I into engagement with the tread of the rail A. In the meantime the clutches on the shaft J will have been put into operative position and the wheels I in revolution. It is evident that the pressure of the wheels I on the rail A can be increased or diminished by increasing or diminishing the strain on the chain $l'$, and the wheels I thus be made to increase the traction of the locomotive to any desired degree.

M represents the tender of the locomotive, the floor $m$ of which abuts against the floor $m'$ of the cab of the locomotive. The forward end of the tender is supported by means of the bars $m^2$, bolted firmly to the locomotive and extending under the floor of the tender, as shown in Fig. 1. The rear end of the tender is carried by a truck in the usual manner. By this arrangement a considerable portion of the weight of the tender is transferred to the locomotive, thereby increasing the traction of the latter.

N N represent inclined wheels having suitable bearings attached to the saddle-frame. One of these wheels is adapted to come in contact with a stringer O, extending along the frame-work of the railway on each side of the rail A, when the truck sways to either side. When the truck is in a perpendicular position, however, the wheels N will be about one inch from the stringers O.

P is a plow attached in any suitable manner to the engine or car to clear snow or other obstruction from the stringers O.

From the foregoing description it will be seen that this invention will greatly increase the traction of the locomotive without materially adding to its weight and without providing a supplemental rail. Furthermore, the additional traction is of a positive character and in no wise strains either the running-gear of the locomotive or the rail, for all strain on the rail caused by the action of the wheels I is exerted in the direction of its length, there being no lateral strain whatever. A comparatively light locomotive is thus made capable of drawing a much heavier load than heretofore.

While I have described my invention as applied to a steam-locomotive, I do not limit myself to such application, for it is evident that it could be applied equally well to other motors employing driving-wheels, irrespective of the nature of the energizing power.

Having described my invention, I claim—

1. In motors for single-rail railways, the combination, with a truck and vertical drivers, of horizontal wheels adapted to laterally grip the tread of the rail on which the drivers run, and suitable means for transmitting the energizing power of the motor to the drivers and the horizontal wheels to give them co-operative action, substantially as specified.

2. In motors for single-rail railways, the combination, with the truck and vertical drivers journaled in said truck, of a saddle-frame supported on the truck, horizontal wheels whose shafts are journaled in the saddle-frame and truck, said wheels being located on opposite sides of the rail on which the driving-wheels run and normally out of engagement therewith, means, substantially as described, to bring the horizontal wheels into engagement with the rail, and suitable means for transmitting the energizing power of the motor to the drivers and the horizontal wheels to give them co-operative action, substantially as specified.

3. In motors for single-rail railways, a truck, vertical drivers journaled in said truck, cranks on the drivers, and suitable means to transmit the energizing power of the motor to the drivers, combined with a horizontal shaft journaled in suitable bearings above the truck, cranks at each end of said shaft connected to the cranks of the drivers, horizontal wheels adapted to laterally grip the tread of the rail on which the drivers run, the vertical shafts of said horizontal wheels being journaled in said truck, a bevel-pinion on the upper end of each of said shafts, and bevel-gears on the horizontal shaft, adapted to engage with the bevel-pinions on the vertical shafts, substantially as specified.

4. In motors for single-rail railways, a truck, vertical drivers journaled in said truck, a horizontal shaft journaled in suitable bearings above the truck, suitable connections between the drivers and the said shaft to give them common rotation, bevel-gears loosely mounted on said shaft, and a suitable clutch mechanism to connect the shaft and bevel-gears, combined with horizontal wheels adapted to laterally grip the tread of the rail on which the drivers run, vertical shafts carrying said wheels and having suitable bearings in said truck, and bevel-pinions on the upper ends of said vertical shafts adapted to engage the bevel-gears on the horizontal shaft, substantially as specified.

5. In motors for single-rail railways, a truck and horizontal wheels whose vertical shafts are journaled in movable bearings attached to said truck, the wheels in their normal position being out of engagement with the rail, combined with levers hinged at one end to suitable supports and adapted to engage the bearings of the said vertical shaft, a toggle-joint connection at the other ends of said levers, and suitable means to operate the toggle-joint to bring the levers toward each other and thereby force the horizontal wheels into contact with the rail, substantially as specified.

6. In locomotives for single-rail railways, a truck having a socket in its upper face, and a saddle-frame suspended from said truck and having a boss to fit in said socket, for the purpose specified, the vertical sides of the saddle-frame being curved, combined with boilers resting in the curved ends of the saddle-frame and a system of braces and ties resting on the top of the truck and connected to the curved ends of the saddle-frame, substantially as set forth.

In testimony whereof I hereto set my hand and seal.

JOHN B. MAHANA. [L. S.]

Witnesses:
EDWIN CRUSE,
E. T. WHITE.